United States Patent
Anghel

(10) Patent No.: US 11,444,462 B2
(45) Date of Patent: Sep. 13, 2022

(54) POWER GENERATION SYSTEM FOR WIDE SPEED RANGE APPLICATIONS

(71) Applicant: Honeywell International Inc., Charlotte, NC (US)

(72) Inventor: Cristian E. Anghel, Tucson, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/167,833

(22) Filed: Feb. 4, 2021

(65) Prior Publication Data

US 2022/0247181 A1 Aug. 4, 2022

(51) Int. Cl.
*H02M 3/158* (2006.01)
*H02J 3/36* (2006.01)
*H02M 7/06* (2006.01)
*H02P 9/02* (2006.01)

(52) U.S. Cl.
CPC .............. *H02J 3/36* (2013.01); *H02M 7/06* (2013.01); *H02P 9/02* (2013.01)

(58) Field of Classification Search
CPC ....................................................... H02J 3/36
See application file for complete search history.

(56) References Cited

U.S. PATENT DOCUMENTS

| | | | |
|---|---|---|---|
| 4,482,813 A * | 11/1984 | Grand-Perret | B60L 50/10 290/40 R |
| 6,297,978 B1 | 10/2001 | Cronmiller et al. | |
| 7,026,794 B1 | 4/2006 | French et al. | |
| 2013/0181688 A1 | 7/2013 | Tupper et al. | |
| 2013/0182466 A1 * | 7/2013 | Lu | H02J 3/386 363/34 |
| 2013/0200617 A1 * | 8/2013 | Smith | H02J 3/381 290/43 |

(Continued)

FOREIGN PATENT DOCUMENTS

JP 2002272072 A 9/2002

OTHER PUBLICATIONS

Intellectual Property Office, Great Britain, "Patents Act 1977, Search Report under Section 17(5)", from GB Application No. GB2200610.0, dated Jul. 11, 2022, from Foreign Counterpart to U.S. Appl. No. 17/167,833, pp. 1 through 4, Published: GB.

*Primary Examiner* — Adi Amrany
*Assistant Examiner* — Esayas G Yeshaw
(74) *Attorney, Agent, or Firm* — Fogg & Powers LLC

(57) ABSTRACT

Techniques for achieving a constant narrow range DC voltage are disclosed. In an embodiment, a system comprises at least one variable speed, multi-phased generator configured to generate an alternating current (AC) voltage. A plurality of diode rectifier circuits is coupled to the at least one multi-phased generator. The plurality of diode rectifier circuits are configured to convert the AC voltage to a direct current (DC) voltage. A plurality of high-power DC contactors is connected to the plurality of diode rectifier circuits. The plurality of high-power DC contactors is configured to configure outputs of the plurality of diode rectifier circuits in one of a parallel, series, and/or mixed parallel and series configuration. A controller coupled to the plurality of diode rectifier circuits and is configured to reconfigure the plurality of high-power DC contactors based on a control parameter of the at least one multi-phased generator.

20 Claims, 12 Drawing Sheets

(56) References Cited

U.S. PATENT DOCUMENTS

| | | | |
|---|---|---|---|
| 2015/0061606 A1* | 3/2015 | Pan | H02P 9/008 |
| | | | 322/7 |
| 2015/0303738 A1* | 10/2015 | Nollet | F03B 17/061 |
| | | | 320/138 |
| 2016/0079899 A1 | 3/2016 | Chong et al. | |
| 2017/0033716 A1* | 2/2017 | Namuduri | H02P 9/00 |
| 2018/0131304 A1 | 5/2018 | Gieras et al. | |
| 2018/0262137 A1 | 9/2018 | Rozman et al. | |
| 2018/0269817 A1 | 9/2018 | Patel et al. | |
| 2019/0097558 A1 | 3/2019 | Rozman et al. | |
| 2019/0257211 A1 | 8/2019 | Huang et al. | |
| 2020/0062234 A1 | 2/2020 | Ugale | |
| 2020/0076340 A1* | 3/2020 | Rozman | H02M 1/12 |
| 2020/0295671 A1* | 9/2020 | Huynh | H02M 1/143 |

\* cited by examiner

POWER GENERATION SYSTEM FOR WIDE SPEED RANGE APPLICATIONS

BACKGROUND

Many large multi-faceted systems or devices require high power and voltage levels to properly function. These systems typically receive power from an electric power system that can generate high voltage direct current (HVDC) and deliver it to the recipient. As the demand for higher power systems has increased, so too has the size of the system needed to supply such power.

HVDC power supply systems may include a high-speed multi-phase generator which generates an alternating current (AC) voltage. The high-speed generator is coupled to circuitry that converts the AC voltage from the generator to a DC voltage that is supplied to a load device. However, the large power levels required by the loads result in a size and weight increase of the high-speed generator. Additionally, the input speed of a high-speed generator (in other words, the rotation rate at which a generator operates to produce voltage) can vary with time, with some wide speed range generators varying as much as a 5:1 (e.g. 4,200-21,000 rpm) input speed range. Maintaining a rated voltage over a variable speed can prove challenging, particularly for a wide speed range generator, since additional modifications are made to the generator that further increase the weight, size, and cost of the already heavy, large, and expensive generator.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a system is provided. The system comprises at least one variable speed, multi-phased generator configured to generate an alternating current (AC) voltage. The system also comprises a plurality of diode rectifier circuits coupled to the at least one multi-phased generator. The plurality of diode rectifier circuits are configured to convert the AC voltage to a direct current (DC) voltage. The system also comprises a plurality of high-power DC contactors connected to the plurality of diode rectifier circuits. The plurality of high-power DC contactors is configured to configure outputs of the plurality of diode rectifier circuits in one of a parallel, series, and/or mixed parallel and series configuration. The system also comprises a controller coupled to the plurality of diode rectifier circuits. The controller is configured to reconfigure the plurality of high-power DC contactors based on a control parameter of the at least one multi-phased generator.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings as briefly described below.

Figure 1:
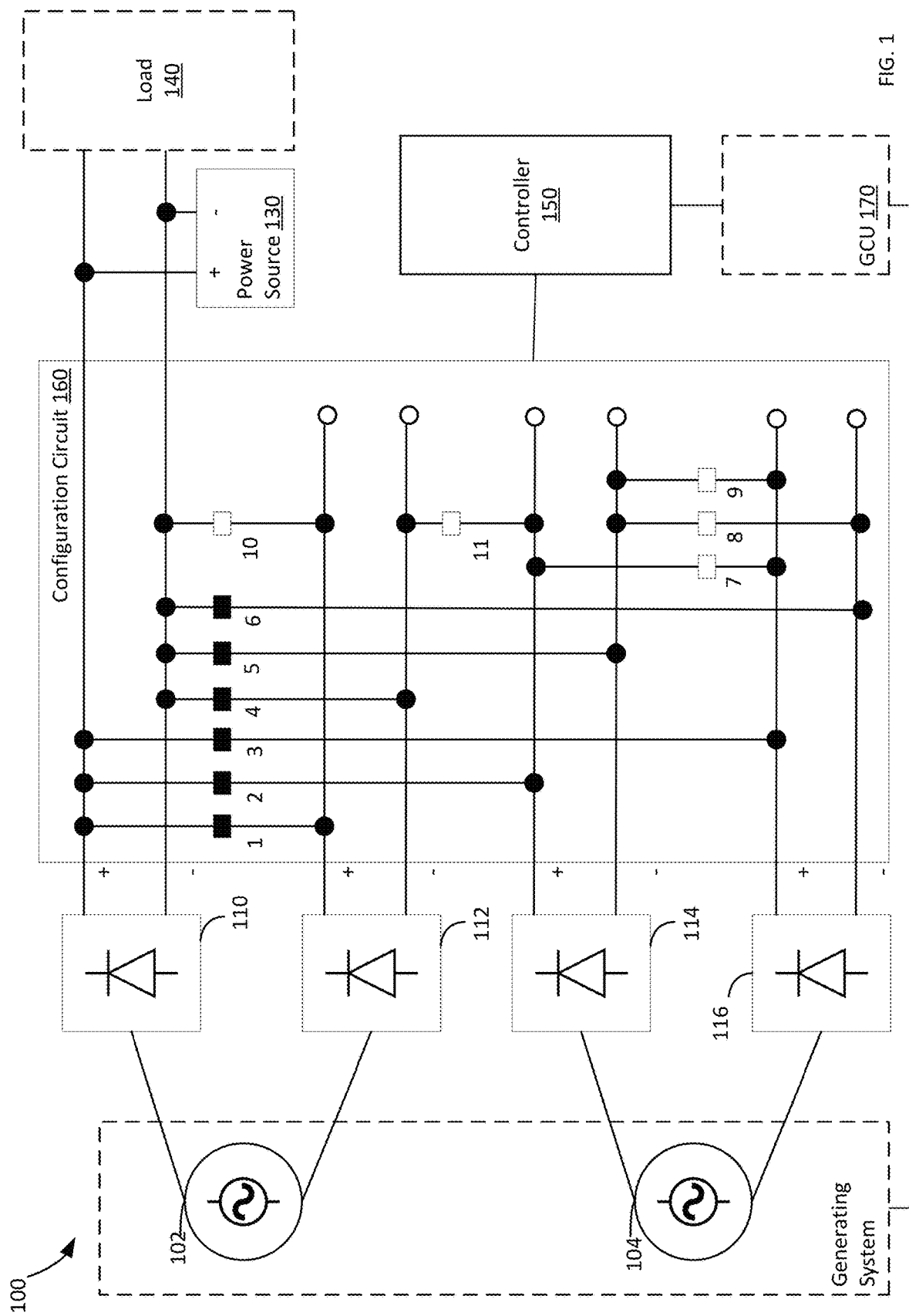
FIG. 1 depicts one example of a power generation system including two multi-phase generators coupled to four diode rectifier circuits, in which four diode rectifier circuit connections are coupled in parallel.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

A contemporary problem arising in electric power systems concerns the voltage output from high powered generators. Particularly for wide speed range generators (define above), output voltage can decrease significantly as the speed of the generator decreases over time. The resulting decrease in voltage output can lead to decreased system performance and even system failure from insufficient load voltage necessary to drive other devices or systems receiving power from the generator. Generators designed for wide speed range can be installed to compensate for the decrease in output voltage, but such generators are large, heavy, and expensive.

The embodiments described below address these problems through an electric power system that can output a constant or nearly constant (e.g., narrow range) high voltage direct current (HVDC) to a load system. As used herein, the term "constant input speed", "constant speed", or "constant speed range" of a generator means an input speed approximately within 90% to 110% of the maximum average input speed for that generator. These embodiments can produce desired HVDC levels nearly independent of generating speed, and therefore are compatible with both narrow speed and wide speed range generators. This can be desirable for new systems or for improving already implemented generating systems while reducing the weight burden on a vehicle by avoiding the installation of larger generators designed for wide speed range.

In general, examples of the improved generating system include one or more multi-phase generators configured to generate an alternating current (AC) voltage to a plurality of diode rectifier circuits. The diode rectifier circuits are electrically coupled together via a plurality of high-power DC contactors that enable the diode rectifier circuits to be connected in series, parallel, or a mix of series-parallel combinations, depending on the input shaft speed of the multi-phase generator(s). When the speed of the multi-phase generators is high (and thus producing their rated voltage), the diode rectifier circuits are generally more configured in parallel to pass a comparable voltage level to a load. When the speed of a generator falls below a certain threshold, the plurality of high-power DC contactors reconfigure the diode rectifier circuits in series or series-parallel combinations to pass an increased voltage as a means to compensate for the decreased speed of the generator, thereby enabling the output voltage to the load to remain at or nearly constant even during long-term performance.

By reference to the examples above and as further described below, the power generation techniques aim to produce a narrow range DC voltage to one or more load devices that remains relatively constant even when compensating for changes in a multi-phase generator. These techniques make adjustments to the configuration of the generator based on "control parameters." For purposes of this specification, the term "control parameters" means an operating characteristic of a multi-phase generator that indicates that the configuration of the generator needs to be changed to maintain a desired operating condition, e.g., a substantially constant voltage. In some embodiments, the control parameter includes the input speed of one or more multi-phase generators in a power generation system. In other embodiments, the control parameter includes an AC voltage output and excitation current of one or more multi-phase generators.

In some embodiments, the power generation system can regulate output DC voltage based on the AC voltage and excitation current of the multi-phase generator. That is, the power generation system can reconfigure the high-power DC contactors when the AC voltage exceeds or falls below a designated threshold parameter. For example, if the AC voltage falls below a threshold and the excitation current is at its maximum value, then the high-power DC contactors can be reconfigured to couple the diode rectifier circuits in a series configuration. Conversely, if the AC voltage exceeds a selected threshold level and the excitation current is not at a selected threshold (e.g., maximum level), then the high-power DC contactors can be reconfigured to couple the diode rectifier circuits in a parallel configuration.

Referring to FIG. 1, a power generation system 100 configured to generate a narrow range DC output voltage is shown. Power generation system 100 includes two multi-phase generators 102 and 104 each coupled to two diode rectifier circuits. As shown in FIG. 1, multi-phase generator is coupled to diode rectifier circuits 110 and 112, while multi-phase generator 104 is similarly coupled to diode rectifier circuits 114 and 116.

Power generation system 100 may be implemented in a vehicle (not shown). Use of the term "vehicle" is not intended to be limiting and includes all classes of vehicles falling within the ordinary meaning of the term. This would include but not limited to, aerial traversing vehicles (e.g., commercial, non-commercial, or recreational aircraft), unmanned and/or space traversing vehicles (e.g., satellites, urban air mobility vehicles), water traversing vehicles (e.g., ships, submarines), and land traversing vehicles (e.g., automobiles including cars, trucks, motorcycles).

Multi-phase generators 102 and 104 are configured to generate an AC current that is separated by a plurality of phase differences. In some embodiments, multi-phase generators 102 and 104 are six-phase generators, where multi-phase generator 102 sends an AC signal to diode rectifier circuit 110 in three distinct phases and another AC signal to diode rectifier circuit 112 in the remaining three phases. Multi-phase generators can also operate at a wide or narrow speed range. In various embodiments, multi-phase generators 102 and 104 operate at a constant or ranged voltage output between 100-300 Vac with constant or ranged operating power between 100-300 kW, though generators with higher or lower specifications are possible. For pedagogical reasons, multi-phase generators 102 and 104 are assumed to have equal rated voltage and power; however, different rated multi-phase generators are also possible.

Diode rectifier circuits 110, 112, 114, and 116 receive the AC output from their respective generators and convert the AC voltage into a direct current (DC) voltage. Each diode rectifier circuit includes a circuit configuration of a plurality of diodes, typically 6 diodes (not shown) with a positive and negative output, as shown in FIG. 1. The outputs of one diode rectifier circuit can be electrically coupled to one or more outputs of another diode rectifier circuit (referred to herein as a "circuit connection" or a "diode rectifier circuit connection") to maintain a nearly constant voltage independent of input speed to the generator. A combined output from the diode rectifier circuits then provides a DC voltage to a load 140.

Power generation system 100 further includes a configuration circuit (e.g., configuration circuit 160) which includes a plurality of high-power DC contactors 1-11 to couple diode rectifier circuits 110, 112, 114, and 116 into various configurations. Each high-power DC contactor can be selectively opened (indicated by a white square) or closed (indicated by a black square), which, when opened, enables current to flow between the diode rectifier circuit connections. High-power DC contactors 1-11 may be controlled by controller 150, which is configured to open or close a designated high-power DC contactor (e.g., through a command signal) based on a system logic algorithm. As described in further detail below, the system logic can be based on the input speed or voltage of the AC signal from the multi-phase generator(s).

Controller 150 may include any one or combination of processors, microprocessors, digital signal processors, application specific integrated circuits, field programmable gate arrays, and/or other similar variants thereof. Controller 150 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures. In some embodiments, controller 150 can include or communicate with a generator control unit (GCU), such as GCU 170.

In some embodiments, the GCU is used to control the electrical excitation supplied to the generator, i.e. the excitation current (such as the output voltage of generators 102 and 104), which is maintained nearly constant independent of load and/or speed variations. Furthermore, the GCU controls the excitation current such that it will not exceed a preset value to protect generators 102 and 104 from over-excitation during operation at speeds lower that the maximum or rated speed.

Figure 11:
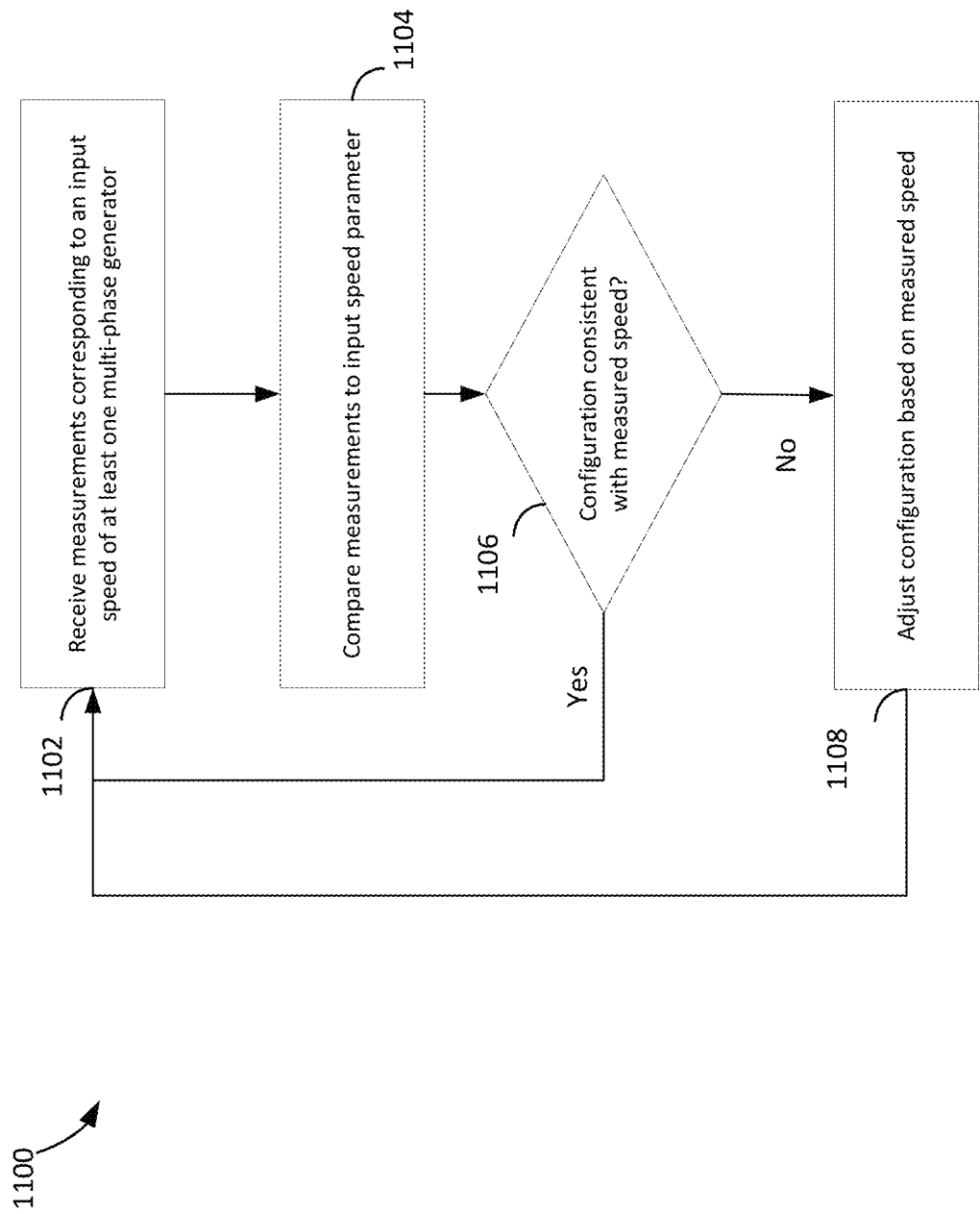
FIG. 11 depicts a flow chart of a method for providing a constant DC voltage level based on a control parameter of a multi-phased generator, when the control parameter includes an input speed parameter.
Figure 12:
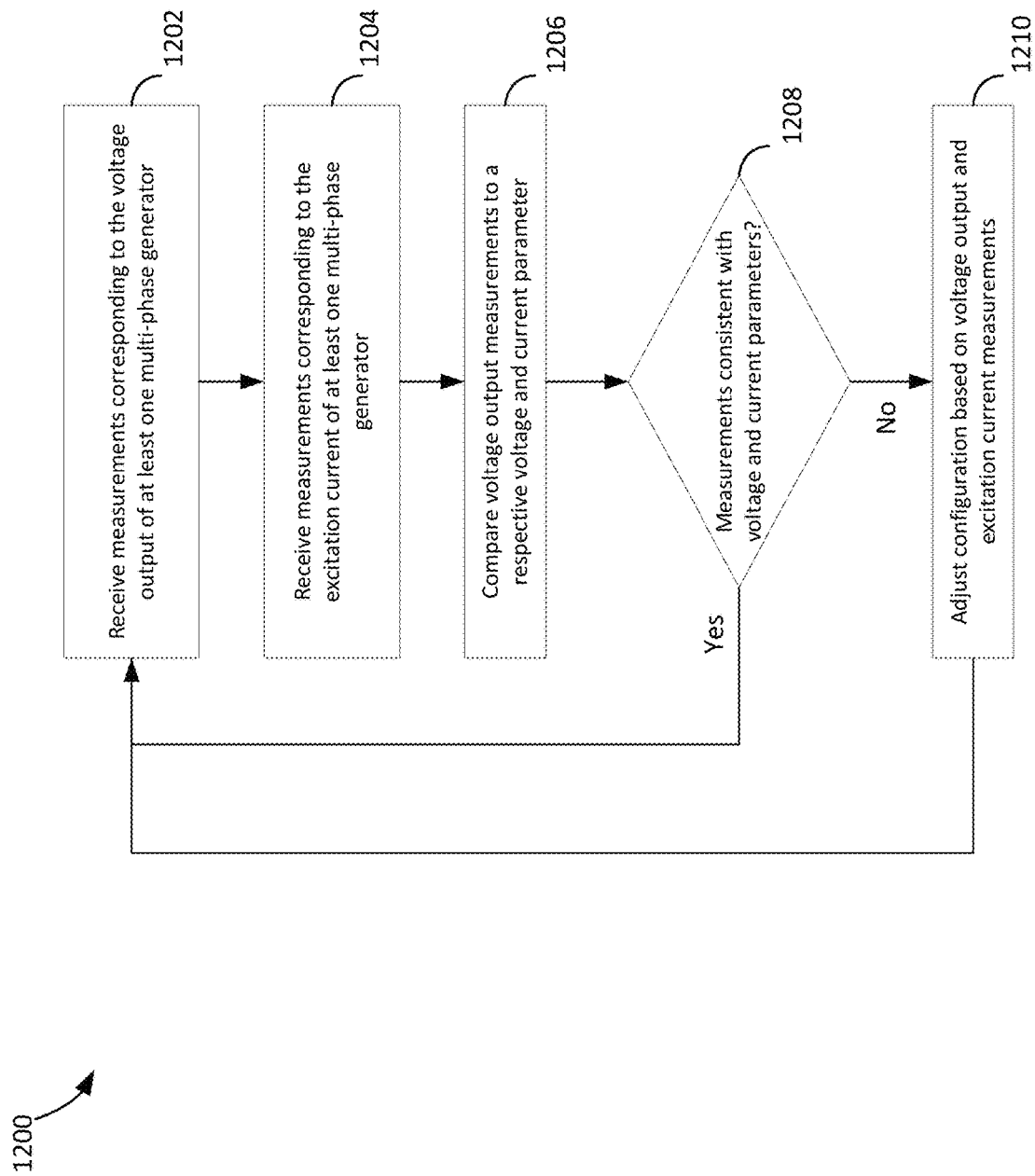
FIG. 12 depicts a flow chart of a method for providing a constant DC voltage level based on a control parameter of a multi-phased generator, when the control parameter includes an AC voltage and excitation current of the multi-phase generator.

Controller 150 can also receive input speed or AC voltage measurements from multi-phase generators 102 and/or 104 e.g., from a sensor or sensor system, where it can compare the received measurements to a selected threshold range, as further described in FIGS. 11-12. Input speed can be calculated from measuring the AC voltage of the generators, calculating its frequency and converting that frequency to speed by using the following formula:

$$n = 120 f/p$$

where f is the frequency and p is the number of poles of the generator.

As shown in FIG. 1, high-power DC contactors 1-6 are closed while high-power DC contactors 7-11 are open. By closing high-power DC contactors 1, 2, and 3, the positive output from diode rectifier circuit 110 are respectively connected to the positive outputs from diode rectifier circuits 112, 114, and 116. In addition, closing high-power DC contactors 4, 5, and 6 results in the coupling between the negative output from diode rectifier circuit 110 to the negative outputs from diode rectifier circuits 112, 114, and 116. As a result, four diode rectifier circuit connections are connected in parallel.

The configuration illustrated in FIG. 1 is suitable for when multi-phase generator 102 and/or 104 is operating at a relatively high input speed or producing a relatively high AC voltage. This is because one or both generators are producing nearly their rated voltage and thus operating close to their optimum design range. In an embodiment, power generation system 100 includes one or both multi-phase generators 102 and 104 operating between 66-100% of their maximum input speed. When the input speed or AC voltage of one (or both) of multi-phase generators 102 and 104 drops below a threshold value (e.g., 66% of the total input speed), controller 150 is configured to reconfigure the outputs of diode rectifier circuits 110, 112, 114, 116 as shown in FIG. 2.

In some embodiments, power generation system 100 includes power source 130. Power source (e.g., a battery) 130 is configured to provide a power source when high-power DC contactors 1-11 undergo reconfiguration. The power source can be an energy storage device such as a battery, fuel cell, or supercapacitor. This way, power generation system 100 can still provide an uninterrupted DC voltage during the brief period in which voltage from multi-phase generators 102 and 104 is reconfigured and disconnected from load 140. Load 140 can include any kind of device or system that receives power via the DC voltage output supplied by power generation system 100. Examples of loads include electric propulsion units, which include high power motor controllers and motors, avionics systems, computers, lights, motors, power outlets, sensors and sensor systems, and navigation systems. In some embodiments, power source 130 can be activated by controller 150 during reconfiguration of high-power DC contactors 1-11. Controller 150 can also communicate with the GCU to modify the excitation to the generator such that a seamless transition is achieved.

Figure 2:
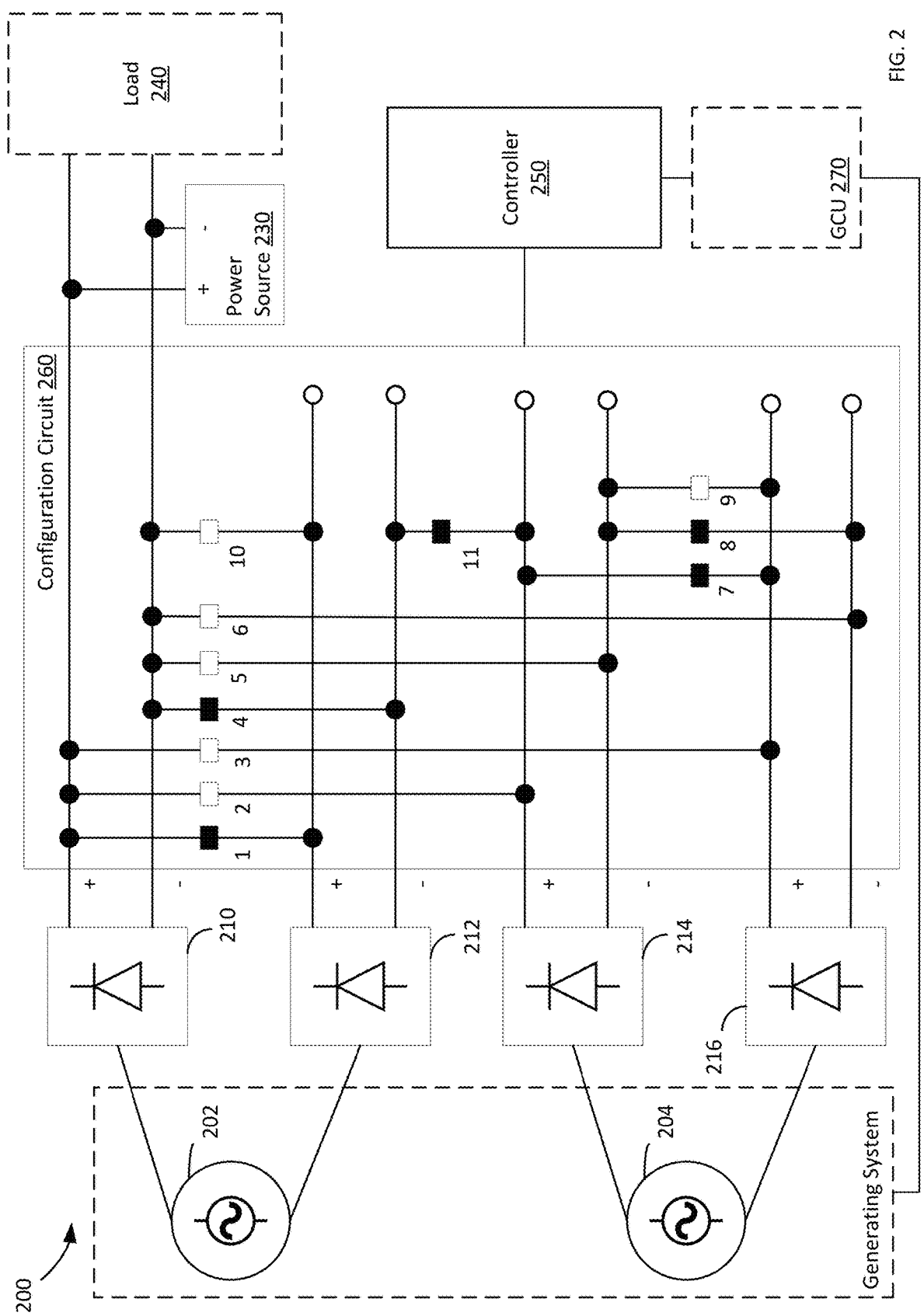
FIG. 2 depicts one example of a power generation system including two multi-phase generators coupled to four diode rectifier circuits, in which two diode rectifier circuit connections are coupled in parallel and two diode rectifier circuit connections are coupled in series.

FIG. 2 illustrates a power generation system 200 in which diode rectifier circuits in power generation system 100 have been reconfigured based on the configuration of high-power DC contactors 1-11. Power generation system 200 functions similarly to power generation system 100 with some further modifications described below.

Instead of having high-power DC contactors 1-6 closed and 7-11 open (as illustrated in FIG. 1), FIG. 2 depicts high-power DC contactors 1, 4, 7-8, and 11 closed and high-power DC contactors 2-3, 5-6, and 9-10 open. By closing high-power DC contactors 1 and 4, the positive and negative output of diode rectifier circuit 210 is respectively coupled to the positive and negative output of diode rectifier circuit 212, thus coupling diode rectifier circuit 210 and 212 in parallel. Similarly, closing high-power DC contactors 7 and 8 enables the positive and negative output of diode rectifier circuit 214 to be respectively coupled to the positive and negative output of diode rectifier circuit 216, which couples these two circuits in parallel.

However, unlike FIG. 1, high-power DC contactor 11 is closed, which couples the negative output of diode rectifier circuit 212 with the positive output of diode rectifier circuit 214. In doing so, diode rectifier circuits 212 and 214 are coupled in series rather than parallel. Power generation system 200 therefore includes two diode rectifier circuit connections coupled in parallel and two diode rectifier circuit connections coupled in series. Since power generation system 200 has two diode rectifier circuit connections coupled in series, the DC output produced by diode bridge circuits 210, 212, 214, and 216 is greater than the AC voltage generated by multi-phase generators 202 and 204. To maintain a constant DC voltage to load 240 then, controller 250 is configured to activate high-power DC contactors 1-11 as shown in FIG. 2 when the input speed or AC voltage of multi-phase generator 202 and/or 204 falls below a threshold value. In an embodiment, controller 250 is configured to reconfigure the output of diode rectifier bridge circuits 210, 212, 214, and 216 when the input speed of multi-phase generator 202 and/or 204 is between 34-66% of its total input speed. When activated, power source 230 provides a backup source of power during reconfiguration of high-power DC contactors 1-11 so that a source of power with nearly constant voltage is provided continuously to load 240. Controller 250 can also reconfigure high-power DC contactors 1-11 back to the configuration shown in FIG. 1 when the input speed or AC voltage rises to a defined threshold or interval.

Figure 3:
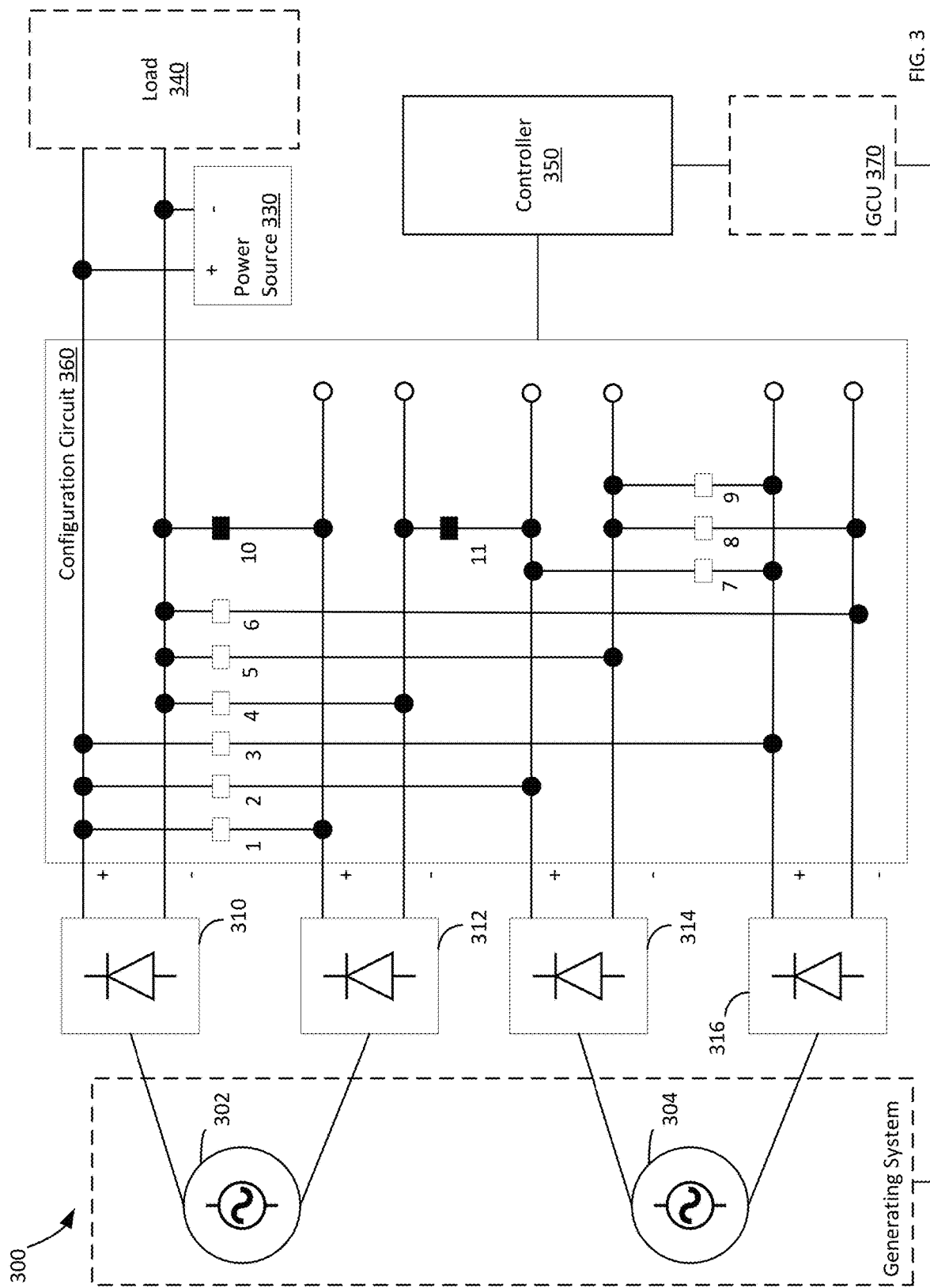
FIG. 3 depicts one example of a power generation system including two multi-phase generators coupled to four diode rectifier circuits, in which three diode rectifier circuit connections are coupled in series.

In other embodiments, power generation systems 100 and 200 may undergo additional reconfiguration of high-power DC contactors 1-11, as shown in FIG. 3. Power generation system 300 functions similarly to power generation systems 100 and 200 with additional modifications described below.

Power generation system 300 includes high-power DC contactors 1-11 configured such that high-power DC contactors 1-9 are open and high-power DC contactors 10-11 are closed. When controller 350 configures the high-power DC contactors to this configuration, the negative output of diode rectifier circuit 310 is electrically coupled to the positive output of diode rectifier circuit 312. Additionally, the negative output of diode rectifier circuit 312 is electrically coupled to the positive output of diode rectifier circuit 314. In this embodiment, neither the positive or negative outputs of diode rectifier circuit 316 are coupled to diode rectifier circuits 310, 312, and 314, thus the DC output of diode rectifier circuit 316 is not provided to load 340.

Accordingly, when controller 350 activates high-power DC contactors 1-11 in the configuration as shown in power generation system 300, three diode rectifier circuit connections are connected in series (i.e. diode rectifier circuits 310, 312, and 314). Connecting three diode rectifier circuits in series can increase the DC voltage that is provided to load 340 and can also increase the DC voltage to a level that is higher than the AC voltage provided from multi-phase generators 302 and 304. To maintain a constant DC voltage to load 340, then, controller 350 reconfigures high-power DC contactors 1-11 once the input speed or AC value of multi-phase generator 302 and/or 304 falls below a threshold level. In an embodiment, controller 350 configures high-power DC contactors 1-11 in the configuration shown in FIG. 3 when the input speed of multi-phase generator 302 and/or 304 is between 23-34% of its total input speed. Power generation system 300 further includes power source 330 to provide a backup power source during reconfiguration of high-power DC contactors 1-11 so that a constant DC voltage is provided to load 340. Controller 150 can also communicate with the GCU to modify the excitation to the generator such that a seamless transition is achieved.

Figure 4:
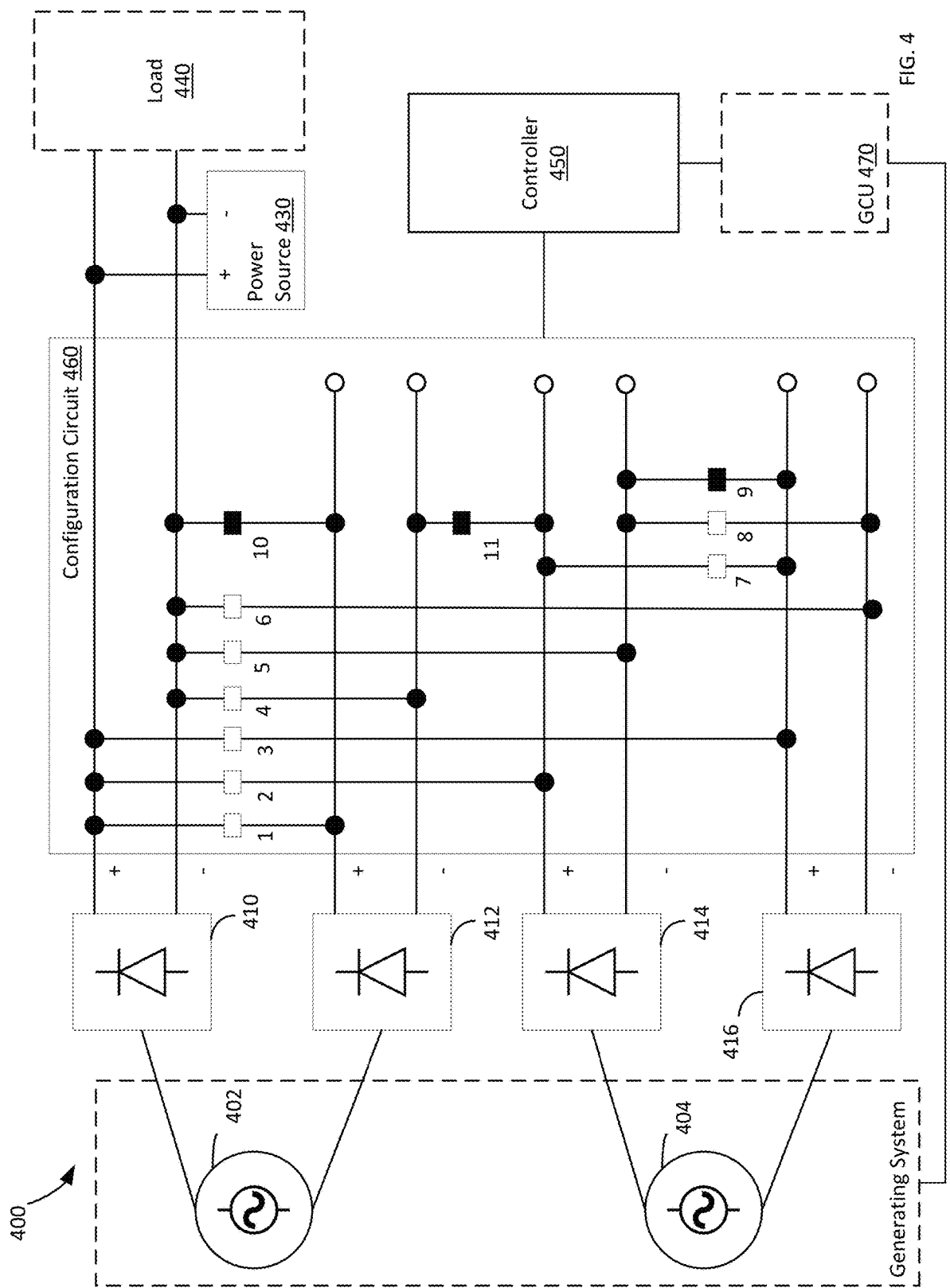
FIG. 4 depicts one example of a power generation system including two multi-phase generators coupled to four diode rectifier circuits, in which four diode rectifier circuit connections are coupled in series.

In some embodiments, high-power DC contactors 1-11 may undergo further reconfiguration as illustrated in FIG. 4. Power generation system 400 functions similarly to power generation systems 100, 200, and 300 with additional modifications as described below.

As shown in FIG. 4, power generation system 400 includes controller 450 which configures high-power DC contactors 1-11 such that high-power DC contactors 1-8 are open and high-power DC contactors 9-11 are closed. In this configuration, the negative output of diode rectifier circuit 410 is coupled to the positive output of diode rectifier circuit 412. The negative output of diode rectifier circuit 412 is likewise coupled to the positive output of diode rectifier circuit 414 in similar fashion. Additionally, in contrast to FIG. 3, the negative output of diode rectifier circuit is connected to the positive output of diode rectifier circuit 416. In this configuration, each diode rectifier circuit is coupled in series, thus creating four diode rectifier circuit connections in series.

By connecting each diode rectifier circuit in series, diode rectifier circuits 410, 412, 414, and 416 can output a greater DC voltage than the AC voltage from multi-phase generators 402 and 404. To maintain a constant DC voltage level to load 440, controller 450 reconfigures high-power DC contactors 1-11 when the input speed or AC voltage of multi-phase generator 402 and/or 404 falls below a threshold level. In one embodiment, controller 450 reconfigures high-power DC contactors 1-11 as shown in Figure when the input speed of multi-phase generator 402 and 404 falls below 23% of its total input speed. Power generation system 400 further includes power source 430 to provide a backup power source during reconfiguration of high-power DC contactors 1-11 so that a constant DC voltage is provided to load 440. Controller 150 can also communicate with the GCU to modify the excitation to the generator such that a seamless transition is achieved.

Figure 5:
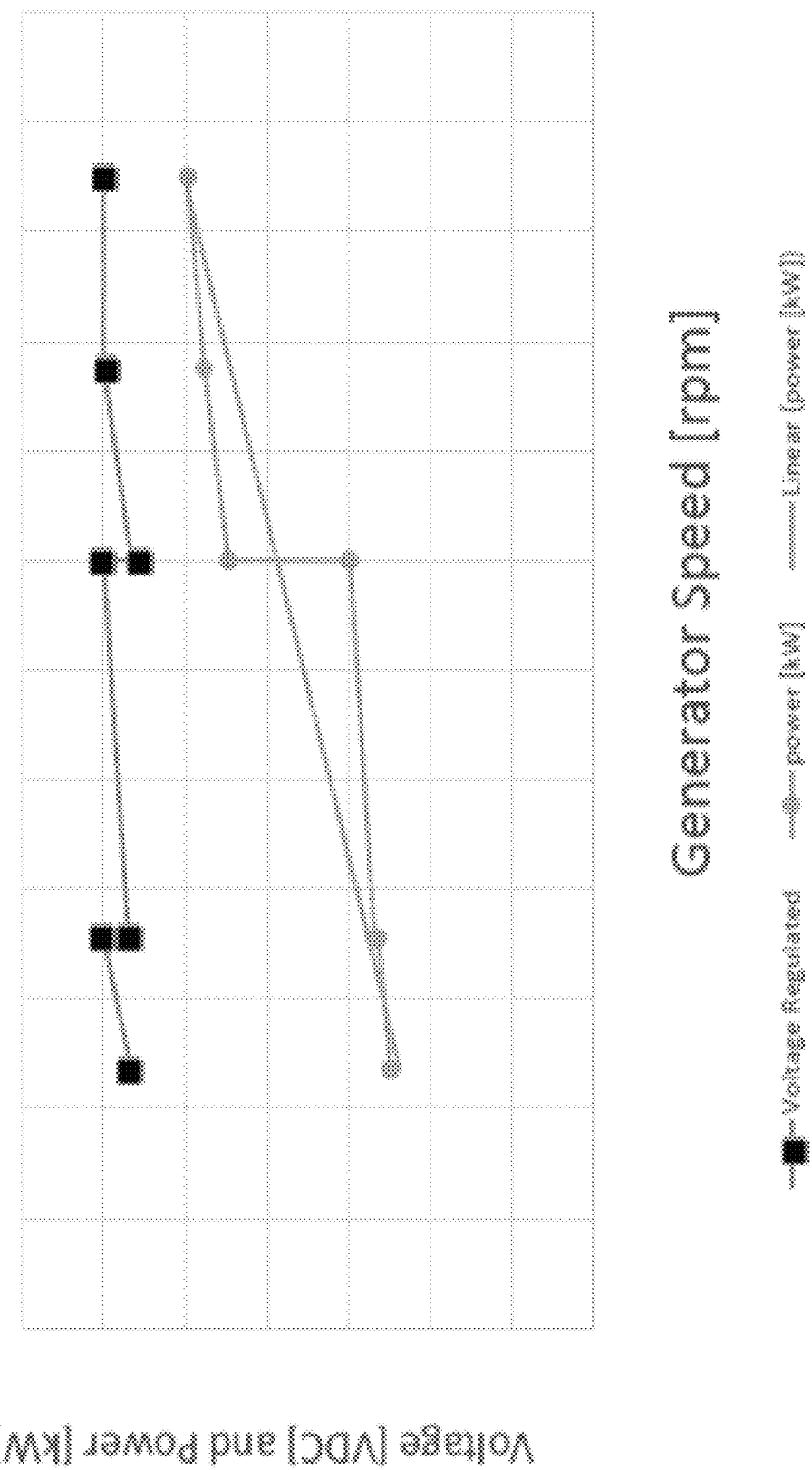
FIG. 5 depicts a graphical illustration of the output DC voltage and power as a function of generator speed for two multi-phase generators.

FIG. 5 illustrates a graph showing the DC output voltage and power as a function of generator speed for two multi-phase generators utilizing the techniques described above. As the generator speed decreases (from right to left), both the power (shown in circular points) and the linear power also decreases. Ordinarily, then, a power generation system utilizing multi-phase generators would see a decrease in output DC voltage as the multi-phase generators lose speed. However, as shown by the regulated voltage (in square points), the output DC voltage of the system remains relatively constant within a narrow speed range notwithstanding a significant decrease (or conversely, increase) in generator speed. Although not explicitly shown in FIG. 5, similar results would apply by replacing the generator speed with the AC voltage from the generator.

To further illustrate the effect of generator controls on the output DC voltage, consider, for example, a threshold input speed parameter between 66-100% (threshold 1) of the input speed of the two multi-phase generators, and a second input speed parameter from 25-66% (threshold 2). When the input speed of the generators is within threshold 1, the diode rectifier circuits are configured in a reduced voltage coupling configuration, such as the configuration shown in FIG. 1 (e.g., each diode rectifier circuit is connected in parallel). When the input speed of the generators falls to threshold 2, the DC output voltage would also normally drop in response. However, by reconfiguring the outputs of the diode rectifier outputs in an alternative configuration such as that shown in FIG. 2, the series combination(s) adjust the DC output voltage so that it still remains within the selected narrow DC voltage range. However, these thresholds are chosen for pedagogical explanation and that other control parameters can be selected.

Figure 6:
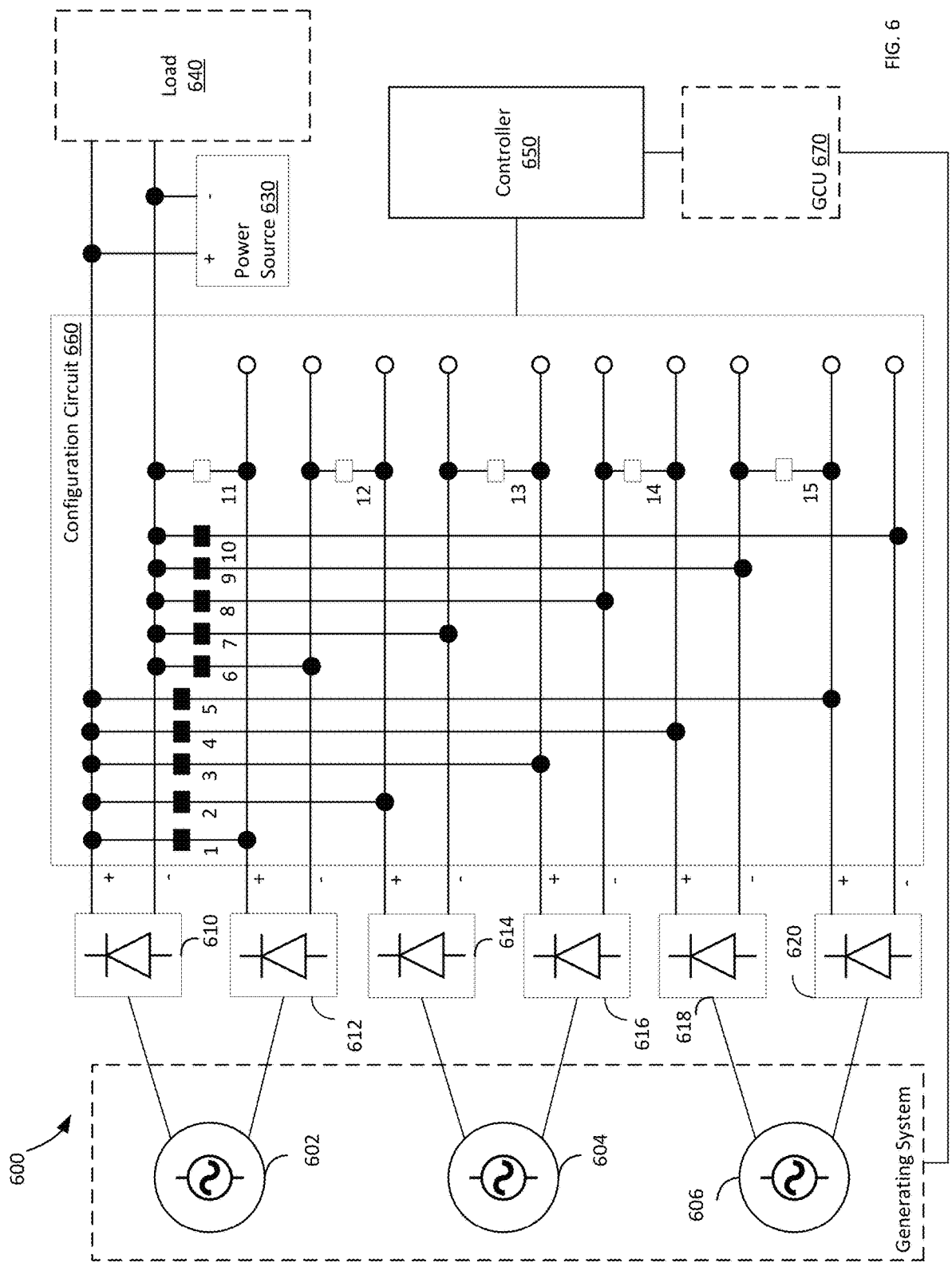
FIG. 6 depicts one example of a power generation system including three multi-phase generators coupled to six diode rectifier circuits, in which six diode rectifier circuit connections are coupled in parallel.

FIG. 6 illustrates another embodiment of a power generation system 600 configured to provide a constant DC voltage. Power generation system 600 includes multi-phase generators 602, 604, and 606 each coupled to two diode rectifier circuits. The structure of the system components (e.g., multi-phase generators, diode rectifier circuits) is similar to their counterparts described above with respect to FIGS. 1-4. Notably, power generation system 600 includes three multi-phase generators and a total of six diode rectifier circuits. However, additional multi-phase generators and diode rectifier circuits can be included.

Multi-phase generators 602, 604, and 606 are configured to generate a rated AC voltage at an input speed approximately that of their total (rated or maximum) input speed; or to put more simply, multi-phase generators 602, 604, and 606 are operating at approximately rated voltage. The DC voltage converted by diode rectifier circuits 610, 612, 614,

616, and 618 can provide a selected DC voltage level to load 640. In some embodiments, this level is 600 VDC or between 565-635 VDC.

Power generation system 600 includes high-power DC contactors 1-15 coupled to the outputs of diode the diode rectifier circuits. In the configuration shown in FIG. 5, high-power DC contactors 1-10 are closed while high-power DC contactors 11-15 are open. When configured in this manner, the positive and negative outputs of diode rectifier circuit 610 are respectively coupled to the positive and negative outputs of diode rectifier circuit 612 (through closing high-power DC contactors 1 and 6). Additionally, the positive and negative outputs of diode rectifier circuit 610 are respectively coupled to the positive and negative outputs of diode rectifier circuit 614 (through closing high-power DC contactors 2 and 7). The same coupling is also present for diode rectifier circuit 616 (high-power DC contactors 3 and 8), diode rectifier circuit 618 (high-power DC contactors 4 and 9), and diode rectifier circuit 620 (high-power DC contactors 5 and 10). Thus, each diode rectifier circuit 612, 614, 616, 618, and 620 is coupled in parallel to diode rectifier circuit 610 so that 6 diode rectifier circuit connections are in parallel.

Controller 650 reconfigures high-power DC contactors 1-15 to a different configuration when the input speed or AC voltage of multi-phase generators 602, 604, and/or 606 falls below a threshold level (as described below), or can reconfigure high-power DC contactors 1-15 back to the configuration shown in FIG. 5 when the input speed or AC voltage rises to a defined threshold or interval. In some embodiments, controller 650 reconfigures high-power DC contactors 1-15 to the configuration shown in FIG. 7 when the input speed of multi-phase generators 602, 604, and/or 606 is between 66-100% of their total (rated or maximum) input speed. Power generation system 600 further includes power source 630 to provide a backup power source during reconfiguration of high-power DC contactors 1-15 so that a constant DC voltage is provided to load 640.

Figure 7:
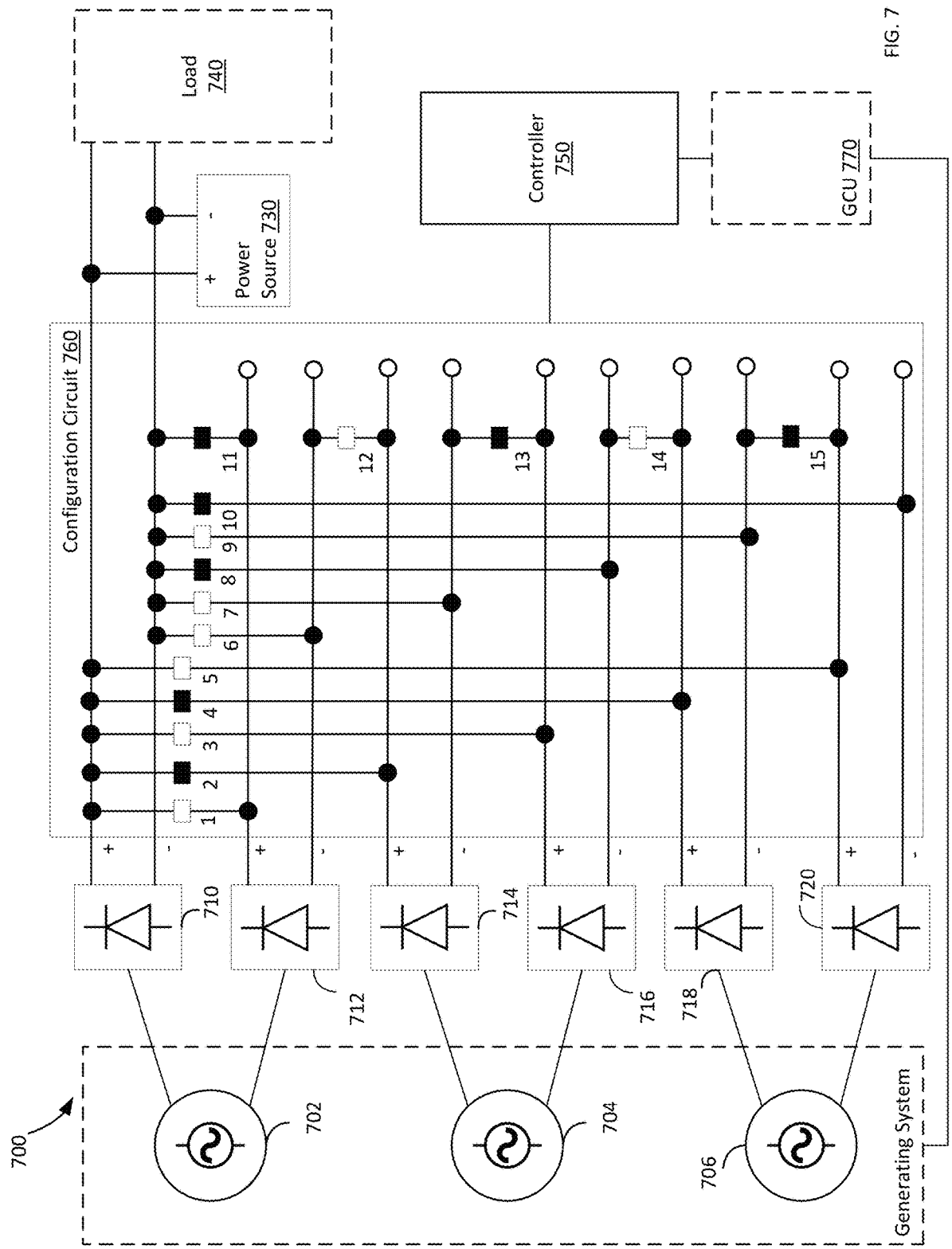
FIG. 7 depicts one example of a power generation system including three multi-phase generators coupled to six diode rectifier circuits, in which two diode rectifier circuit connections are coupled in series and three diode rectifier circuit connections are coupled in parallel.

When the voltage of multi-phase generators 602, 604, and 606 decreases as function of input speed reduction, controller 650 can reconfigure high-power DC contactors 1-15 to the configuration shown in FIG. 7. Power generation system 700 includes high-power DC contactors 1-15 configured such that high-power DC contactors 1, 3, 5-7, 9, 12, and 14 are open while high-power DC contactors 2, 4, 8, 10-11, 13, and 15 are closed. By closing high-power DC contactors 11, 13, and 15, the negative output of a first diode rectifier circuit (e.g., diode rectifier circuit 710, 714, 718) is connected to a positive output of a second diode rectifier circuit (e.g., diode rectifier circuit 712, 716, 720) for each multi-phase generator. This will result in a series connection of the outputs of rectifier circuits. Accordingly, the converted DC voltage for each pair of diode rectifier circuits approximately doubles the AC voltage received from the respective multi-phase generator.

Additionally, closing high-power DC contactors 2, 4, 8, and 10 mean that the positive output of diode rectifier circuit 710 is coupled to the positive output of diode rectifier circuit 714 and diode rectifier circuit 718, while the negative output of diode rectifier circuit 710 is coupled to the negative output of diode rectifier circuit 716 and diode rectifier circuit 720. Thus, each group of diode rectifier circuits corresponding to each multi-phase generator 702, 704, and 706 are connected in parallel. Since each group of diode rectifier circuits convert approximately twice the voltage of each diode rectifier circuit, power generation system 700 can output a DC voltage approximately double the voltage generated from one of each diode rectifier circuits. To therefore maintain a constant DC voltage level or interval, controller 750 reconfigures high-power DC contactors 1-15 as shown in FIG. 7 when the input speed or AC voltage of multi-phase generator 702, 704, and/or 706 falls below a threshold level. In one embodiment, controller 750 reconfigures high-power DC contactors 1-15 in FIG. 6 when the input speed of multi-phase generator 702, 704, and/or 706 is between 34-66% of the total input speed. Power generation system 700 also includes battery 730 to provide a backup power source during reconfiguration of high-power DC contactors 1-15 so that a constant DC voltage is provided to load 740. Controller 750 can also communicate with the GCU to modify the excitation to the generator such that a seamless transition is achieved.

Figure 8:
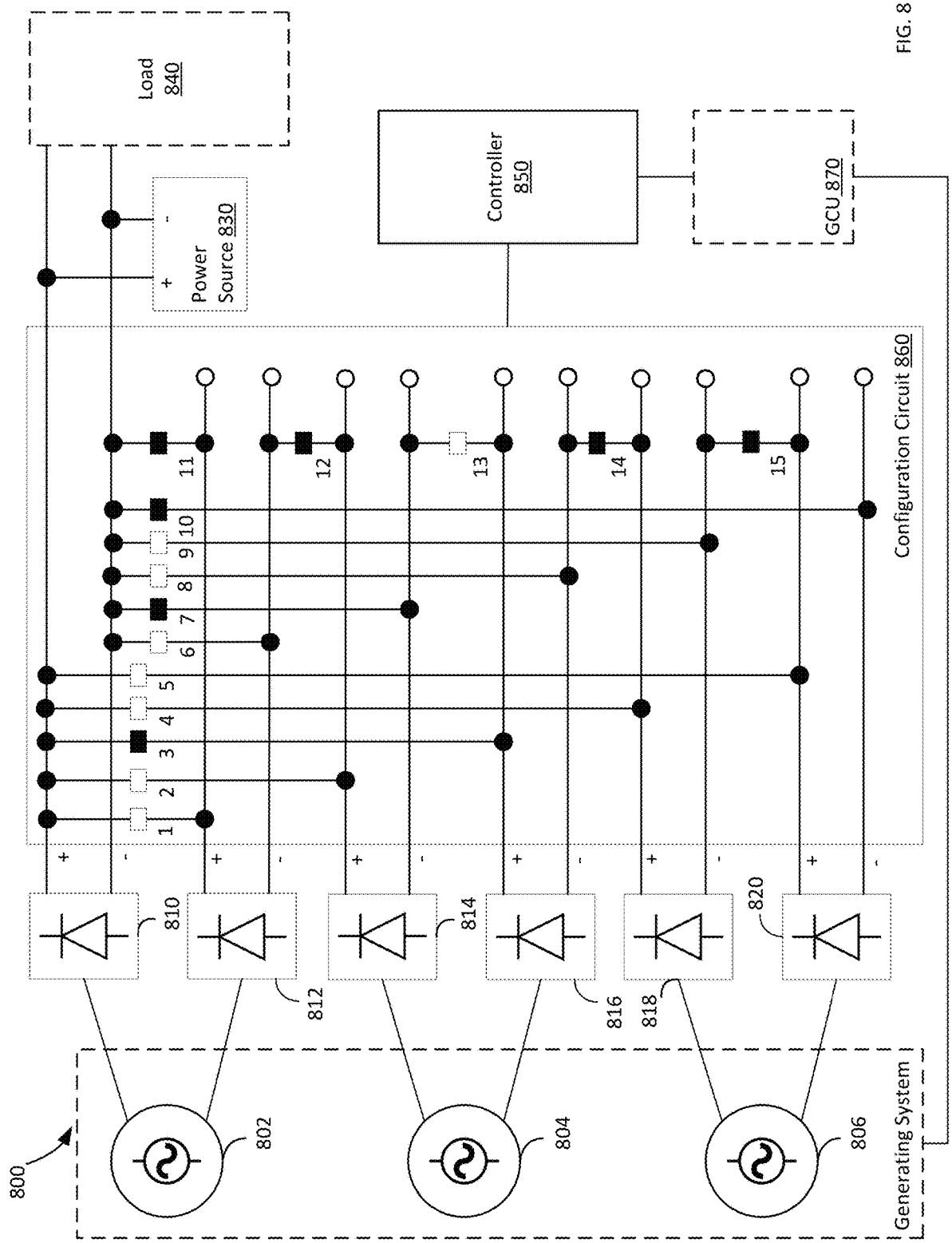
FIG. 8 depicts one example of a power generation system including three multi-phase generators coupled to six diode rectifier circuits, in which three diode rectifier circuit connections are coupled in series and two diode rectifier circuit connections are coupled in parallel.

When the voltage of power generation system 700 decreases further, controller 750 can reconfigure switches 1-15 as shown in FIG. 8. Here, high-power DC contactors 1-2, 4-6, 8-9, and 13 are open while high-power DC contactors 3, 7, 10-12, and 14-15 are closed. By closing high-power DC contactors 11 and 12, the negative output of diode rectifier circuit 810 is connected to the positive output of diode rectifier circuit 812 and the negative output of diode rectifier circuit 812 is connected to the positive output of diode rectifier circuit 814. This creates a group of three diode rectifier circuits connected in series, which approximately triples the DC output of each diode rectifier circuit. Another group of three diode rectifier circuits (circuits 816, 818, and 820) are also connected in series by closing high-power DC contactors 14 and 15, thus tripling the voltage of each diode rectifier circuit.

When high-power DC contactors 3, 7, and 10 are closed, the positive output of diode rectifier circuit 810 is connected to the positive output of diode rectifier circuit 816 of group 2. Additionally, the negative output of diode rectifier circuit 810 is connected to the negative output of diode rectifier circuit 814 of group 1, as well as the negative output of diode rectifier circuit 820 of group 2. In doing so, the first group (circuits 810, 812, and 814) are connected in parallel with the second group (circuits 816, 818, and 820). Power generation system 800 can therefore output a DC voltage to load 840 that is approximately three times the voltage generated by each diode rectifier circuit.

To maintain a constant DC voltage level or interval to load 840, controller 850 configures high-power DC contactors 1-15 as shown in FIG. 8 when the input speed or AC voltage of multi-phase generators 802, 804, and/or 806 falls below a threshold level. In some embodiments, controller 850 configures high-power DC contactors 1-15 in FIG. 8 when the input speed of multi-phase generators 802, 804, and/or 806 are between 25-34% of its total input speed. Power generation system 800 also includes power source 830 to provide a backup power source during reconfiguration of high-power DC contactors 1-15 so that an uninterrupted DC voltage is provided to load 840. Controller 850 can also communicate with the GCU to modify the excitation to the generator such that a seamless transition is achieved.

The embodiments shown and described with respect to FIGS. 1-8 are not meant to be limiting and can be further modified to other configurations of high-power DC contactors not explicitly described. For example, a power generation system with three multi-phase generators (e.g., power generation systems 600-800) can be further modified to provide a DC voltage level approximately four times the voltage each diode rectifier circuit, by connecting additional diode rectifier circuits in series. Therefore, power generation systems 100-800 should not be understood as exclusive embodiments but as depictions of various examples of which a power generation system may be configured.

Figure 9:
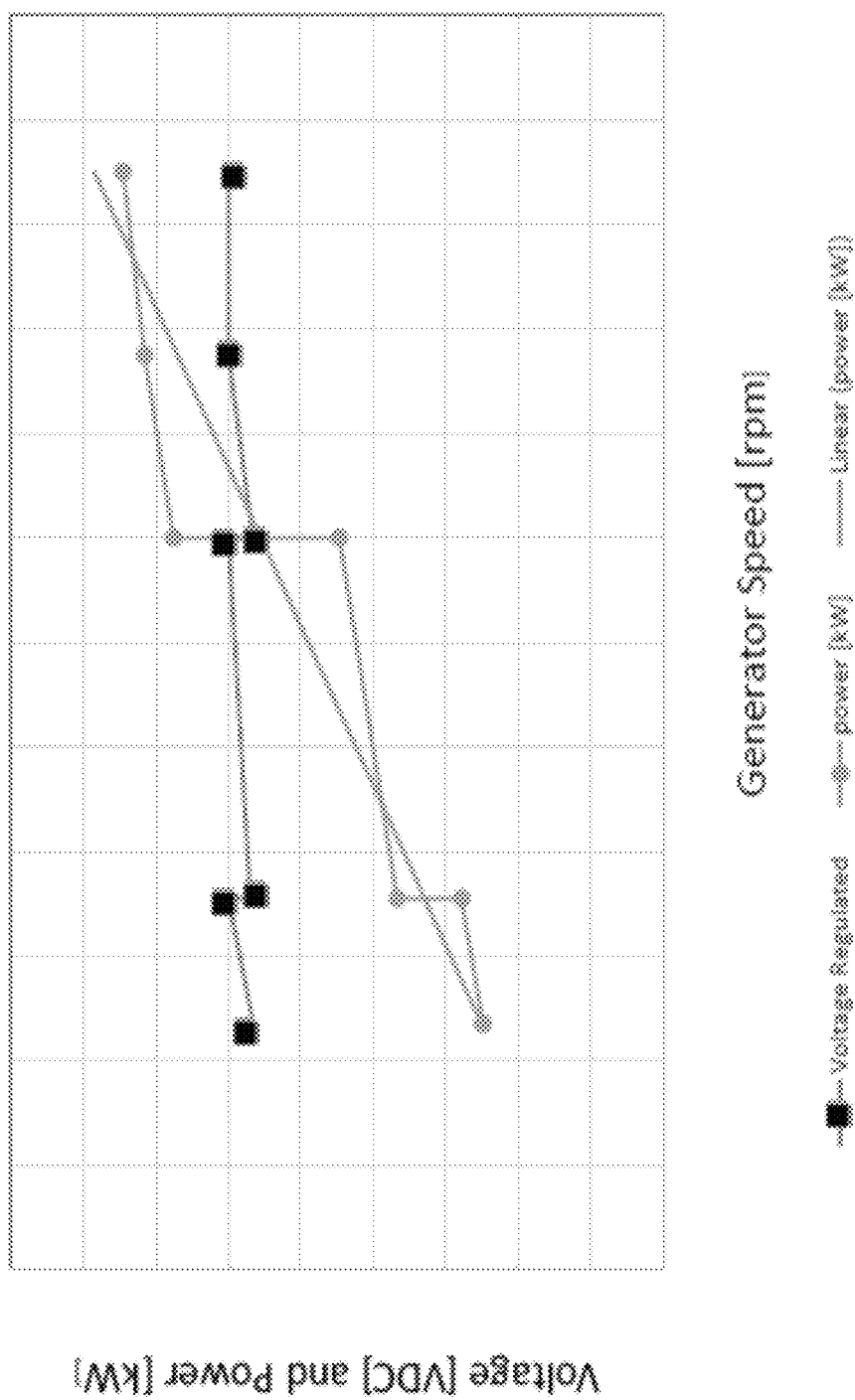
FIG. 9 depicts a graphical illustration of the output DC voltage and power as a function of generator speed for four multi-phase generators.

FIG. 9 illustrates a graph showing the DC output voltage and power as a function of generator speed for three multi-phase generators utilizing the techniques described above. As the generator speed decreases (from right to left), both the power (shown in circular points) and the linear power also decreases. Ordinarily, then, a power generation system utilizing three multi-phase generators would see a decrease in output DC voltage as the multi-phase generators lose speed. However, as shown by the regulated voltage (in square points), the output DC voltage of the system remains relatively constant within a narrow voltage range notwithstanding a significant decrease (or conversely, increase) in generator speed. Although not explicitly shown in FIG. 5, similar results would apply by replacing the generator speed with the AC voltage from the generator.

To further illustrate the effect of input speed on the output DC voltage, consider, for example, a threshold input speed parameter between 75-100% (threshold 1) of the input speed of the two multi-phase generators, a second input speed parameter from 50-75% (threshold 2), and a third input speed parameter from 25-50% (threshold 3). When the input speed of the generators is within threshold 1, the diode rectifier circuits are configured in a lower coupling configuration, such as the configuration shown in FIG. 6 (e.g., each diode rectifier circuit is connected in parallel). When the input speed of the generators falls to threshold 2, the DC output voltage would also normally drop in response. However, by reconfiguring the outputs of the diode rectifier outputs in an alternative configuration such as that shown in FIG. 3, the series combination(s) adjust the DC output voltage so that it still remains within the selected narrow DC voltage range. The same result is true when the input speed of the generators falls to threshold 3. However, these thresholds are chosen for pedagogical explanation and that other control parameters can be selected.

Figure 10:
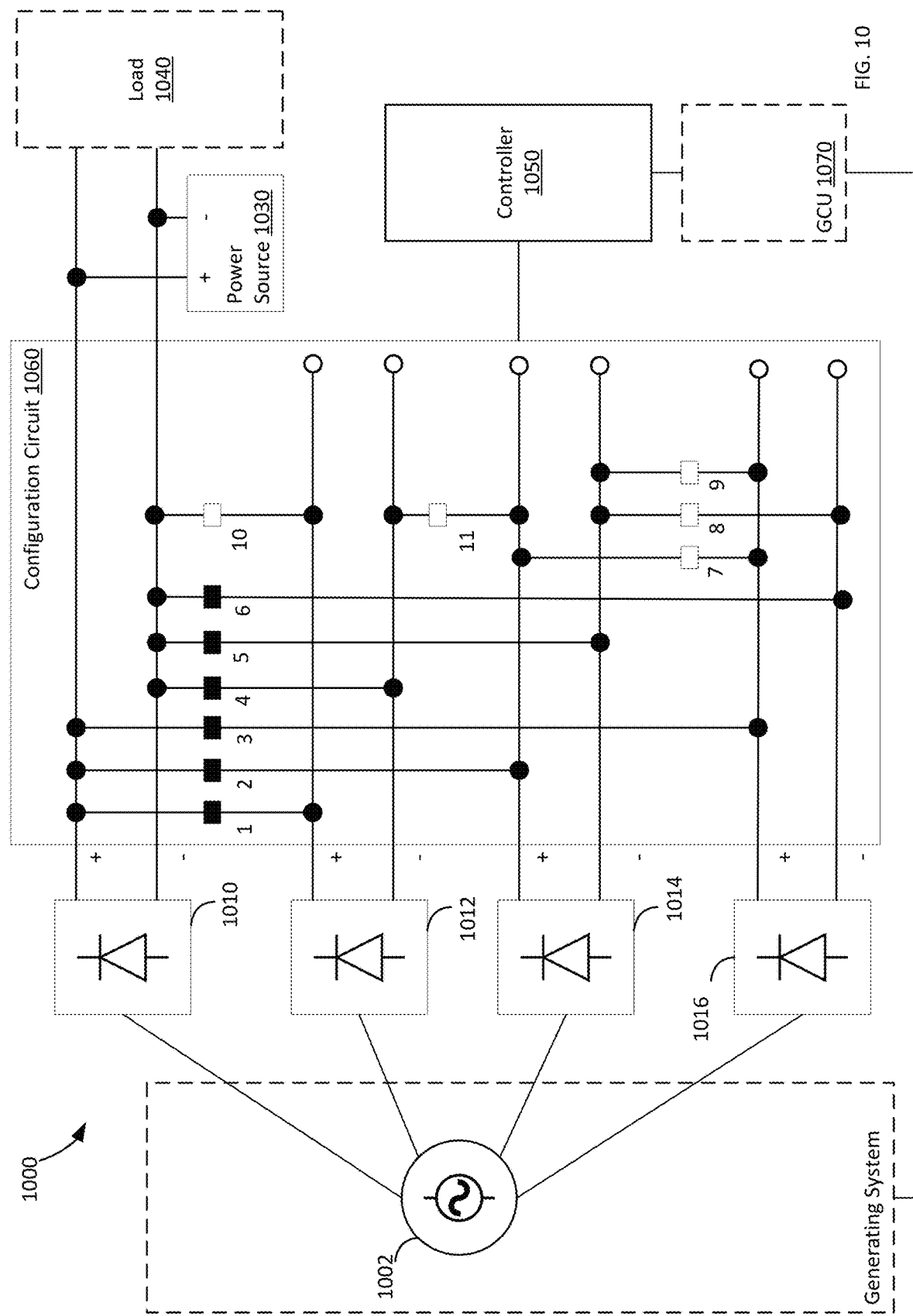
FIG. 10 depicts one example of a power generation system including one multi-phase generator coupled to four diode rectifier circuits, in which four diode rectifier circuit connections are coupled in parallel.

Referring to FIG. 10, a power generation system 1000 is illustrated to provide a constant DC voltage to a load 1040. In contrast to FIGS. 1-8, power generation system 1000 includes only one multi-phase generator 1002 that provides AC voltage to diode rectifier circuits 1010, 1012, 1014, and 1016 at multiple phase differences. For example, multi-phase generator 1002 can be a twelve-phase generator, which generates an AC voltage to each diode rectifier circuit in three phase differences.

Power generation system 1000 includes high-power DC contactors 1-11 which can be closed or opened depending on instructions received by controller 1050. For pedagogical illustration, high-power DC contactors 1-11 are configured similarly to the configuration shown in FIG. 1; that is, high-power DC contactors 1-6 are closed while high-power DC contactors 7-11 are open. As described above, this enables diode rectifier circuit 1010 to be configured in parallel with diode rectifier circuits 1012, 1014, and 1016, in which the DC voltage level provided to load 1040 is approximately equal to the AC voltage generated by multi-phase generator 1002. In one embodiment, the rectified voltage is approximately 1.35 times the line-to-line AC voltage of the generator. However, controller 1050 can reconfigure high-power DC contactors 1-11 in different configurations as shown in FIGS. 2-4 as well to provide a constant DC voltage to load 1040, depending on the input speed, AC voltage, or excitation current of multi-phase generator 1002.

FIG. 11 is a flow chart of a method 1100 of operating a power generation system to provide a constant DC voltage in an example embodiment. Method 1100 may be implemented via the techniques described with respect to FIGS. 1-10, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 1100 begins at block 1102 by receiving measurements corresponding to an input speed of at least one multi-phase generator, for example, through a sensor/sensing system or other circuitry configured to measure the input speed of a multi-phase generator.

At block 1102, method 1100 compares the input speed measurements to a selected input speed parameter. The selected input speed parameter is an example control parameter that represents a threshold speed range of the one or more multi-phase generators, such as 66-100% of the total input speed of the one or more multi-phase generators.

Proceeding to block 1106, method 1100 determines whether the configuration of the diode rectifier circuits is consistent with the measured speed, e.g., whether the input speed measurements are within the input speed parameter. If the measurements are within the input speed parameter, for example, if the input speed of the multi-phase generator is 75%, then method 1100 maintains the current configuration of the diode rectifier circuits and reverts back to block 1102 to determine at a later time period whether the multi-phase generator is still operating at an input speed within the specified parameter.

If the input speed measurements are not within the input speed parameter e.g., the input speed measurements indicate that the multi-phase generator is operating at a lower input speed, then method 1100 proceeds to block 1108 by reconfiguring the plurality of diode rectifier circuits, in which the plurality of diode rectifier circuits are configured to convert an AC voltage generated from the multi-phase generator to a DC voltage. For example, if the plurality of diode rectifier circuits are configured in parallel, then method 1100 can reconfigure the plurality of diode rectifier circuits to be in series, or a mix of series/parallel, in response to determining that the input speed of the multi-phase generator is less than the input speed parameter. The input speed parameter can also be changed in response to the input speed falling outside of the previously monitored input speed parameter. For example, if the input speed of the multi-phase generators falls below 75%, then at block 1104, method 1100 compares received input speed measurements at a new input speed parameter, such as an input speed range of 66-75%. The input speed parameter can therefore change as the input speed of the generators change.

FIG. 12 is a flow chart of a method 1200 of operating a power generation system to provide a constant DC voltage in an example embodiment. Method 1200 may be implemented via the techniques described with respect to FIGS. 1-10, but may be implemented via other techniques as well.

Method 1200 begins at block 1202 by receiving measurements corresponding to the AC voltage output of at least one multi-phase generator. At block 1204, method 1200 proceeds by receiving measurements corresponding to the excitation current of the at least one multi-phase generator, e.g., the current that is supplied to the diode rectifier circuits.

Proceeding to block 1206, method 1200 compares the voltage output measurements to a voltage parameter and the excitation current measurements to a current parameter. For example, the voltage parameter can be a threshold percentage of a rated generator voltage (such as 66%-75% of the rated voltage), and the current parameter can be a selected generator excitation current value (e.g., the maximum generator excitation current).

Method 1200 then determines whether the voltage output measurements and excitation current measurements are consistent with the voltage and current parameters. If the voltage parameter is, for instance, an AC voltage output between 75-100% of the rated voltage of the generator, the voltage output measurements are consistent if they fall within that range. If the excitation current parameter is a maximum allowed current threshold, then the excitation current measurements are consistent if they fall below that threshold.

If the measurements are not consistent with the applicable control parameter, then method 1200 proceeds to block 1210. For example, if the AC voltage falls below the voltage parameter and the excitation current is at its maximum value, then method 1200 adjusts the configuration of the diode rectifier circuits based on the voltage output and excitation current measurements. In the example described above, method 1200 adjusts the configuration to a higher voltage configuration, for example a series or mixed-series configuration. Conversely if the AC voltage is at a selected threshold level and the excitation current is not at its maximum, method 1200 adjusts the diode rectifier circuits at block 1210 to a lower voltage configuration, such as a parallel or mixed-parallel configuration. Additionally, method 1200 may change the voltage and/or excitation current parameter to reflect the new configuration of the diode rectifier circuits. Otherwise, if the measurements are consistent with the control parameters, method 1200 maintains the current configuration of the diode rectifier circuits and method 1200 may then revert back to block 1202 to receive different voltage output and excitation current measurements of the at least one multi-phase generator.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk—Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Generally, a processor will receive instructions and data from a read-only memory and/or a random-access memory. Storage devices suitable for tangibly embodying computer program instructions and data include all forma of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs.

EXAMPLE EMBODIMENTS

Example 1 includes a system, comprising: at least one variable speed, multi-phased generator configured to generate an alternating current (AC) voltage; a plurality of diode rectifier circuits coupled to the at least one multi-phased generator, wherein the plurality of diode rectifier circuits are configured to convert the AC voltage to a direct current (DC) voltage, a plurality of high-power DC contactors connected to the plurality of diode rectifier circuits, wherein the plurality of high-power DC contactors is configured to configure outputs of the plurality of diode rectifier circuits in one of a parallel, series, and/or mixed parallel and series configuration; and a controller coupled to the plurality of diode rectifier circuits, wherein the controller is configured to reconfigure the plurality of high-power DC contactors based on a control parameter of the at least one multi-phased generator.

Example 2 includes the system of Example 1, wherein the control parameter includes an input speed of the at least one multi-phased generator, and wherein the controller is configured to reconfigure the high-power DC contactors so that the outputs of the plurality of diode rectifier circuits are in a higher voltage configuration when the input speed falls below a threshold range.

Example 3 includes the system of any of Examples 1-2, wherein the control parameter includes an input speed of the at least one multi-phased generator, wherein the controller is configured to reconfigure the high-power DC contactors so that the outputs of the plurality of diode rectifier circuits are in a lower voltage configuration when the input speed rises above a threshold range.

Example 4 includes the system of Example 3, wherein the control parameter includes the AC voltage and an excitation current of the at least one multi-phased generator, and wherein the controller is configured reconfigure the high-power DC contactors so that the outputs of the plurality of diode rectifier circuits are in a lower voltage configuration when the AC voltage rises above a threshold range and the excitation current is not at a maximum value.

Example 5 includes the system of any of Examples 1-4, further comprising a power source coupled to the plurality of diode rectifier circuits, wherein the power source is configured to provide an uninterrupted DC voltage when the high-power DC contactors are being reconfigured.

Example 6 includes the system of any of Examples 1-5, wherein the control parameter includes the AC voltage and an excitation current of the at least one multi-phased generator, and wherein the controller is configured to reconfigure the high-power DC contactors so that the outputs of the plurality of diode rectifier circuits are in a higher voltage configuration when the AC voltage falls below a threshold range and the excitation current is at a maximum value.

Example 7 includes the system of any of Examples 1-6, wherein the at least one multi-phase generator comprises a plurality of six-phases each coupled to a respective pair of diode rectifier circuits of the plurality of diode rectifier circuits.

Example 8 includes the system of any of Examples 1-7, wherein the at least one multi-phase generator comprises a twelve-phase generator.

Example 9 includes a method, comprising: receiving measurements corresponding to an input speed of at least one multi-phased generator; comparing the measurements to a selected control parameter; and reconfiguring outputs of a plurality of diode rectifier circuits based on the comparison, wherein the plurality of diode rectifier circuits are coupled to the at least one multi-phased generator and configured to convert an alternating current (AC) voltage to a direct current (DC) voltage.

Example 10 includes the method of Example 9, wherein the selected control parameter is an input speed of the at least one multi-phased generator, and wherein reconfiguring outputs of the plurality of diode rectifier circuits comprises reconfiguring the outputs to be in a higher voltage configuration when the input speed falls below a threshold value.

Example 11 includes the method of any of Examples 9-10, wherein reconfiguring outputs of the plurality of diode rectifier circuits comprises reconfiguring a plurality of high-power DC contactors coupled to the outputs, wherein the plurality of high-power DC contactors are configured to configure the outputs of the plurality of diode rectifier circuits to one of a parallel, series, and/or mixed parallel and series configuration.

Example 12 includes the method of any of Examples 9-11, wherein the selected control parameter is an input speed parameter of the at least one multi-phased generator, and wherein reconfiguring outputs of the plurality of diode rectifier circuits comprises reconfiguring the outputs to be in a lower voltage configuration when the input speed rises above a threshold value.

Example 13 includes the method of any of Examples 9-12, further comprising providing a backup DC voltage when the outputs of plurality of diode rectifier circuits are being reconfigured.

Example 14 includes the method of any of Examples 9-13, further comprising selecting a different control parameter in response to reconfiguring the outputs of the plurality of diode rectifier circuits.

Example 15 includes the method of any of Examples 9-14, further comprising delivering the DC voltage output to one or more load devices.

Example 16 includes a non-transitory computer-readable medium having computer-executable instructions stored thereon which, when executed by one or more processors, cause the one or more processors to: receive measurements corresponding to an input speed of at least one multi-phased generator; compare the measurements to a selected control parameter; and reconfigure outputs of a plurality of diode rectifier circuits based on the comparison, wherein the plurality of diode rectifier circuits are coupled to the at least one multi-phased generator and configured to convert an alternating current (AC) voltage to a direct current (DC) voltage.

Example 17 includes the non-transitory computer-readable medium of Example 16, wherein the selected control parameter includes an AC voltage and excitation current of the at least one multi-phased generator, and wherein to reconfigure outputs of a plurality of diode rectifier circuits further comprises to reconfigure the outputs to be in a higher voltage configuration when the AC voltage falls below a threshold range and the excitation current is at a maximum value.

Example 18 includes the non-transitory computer-readable medium of Example 17, wherein to reconfigure outputs of a plurality of diode rectifier circuits based on the comparison further comprises to reconfigure the outputs of the plurality of diode rectifier circuits when the measurements fall below the selected input speed parameter.

Example 19 includes the non-transitory computer-readable medium of any of Examples 16-18, further comprising a power source coupled to the plurality of diode rectifier circuits, wherein the instructions further cause the one or more processors to activate the power source to provide a backup DC voltage when the outputs of the plurality of diode rectifier circuits are being reconfigured.

Example 20 includes the non-transitory computer readable medium of any of Examples 16-19, wherein the selected control parameter includes an AC voltage and excitation current of the at least one multi-phased generator, and wherein to reconfigure the outputs of a plurality of diode rectifier circuits further comprises to reconfigure the outputs to be in a lower voltage configuration when the AC voltage rises above a threshold range and the excitation current is not at a maximum value.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:
   at least one variable speed, multi-phased generator configured to generate an alternating current (AC) voltage;
   a plurality of diode rectifier circuits coupled to the at least one multi-phased generator, wherein the plurality of diode rectifier circuits are configured to convert the AC voltage to a direct current (DC) voltage,
   a plurality of high-power DC contactors connected to the plurality of diode rectifier circuits, wherein the plurality of high-power DC contactors is configured to configure outputs of the plurality of diode rectifier circuits in one of a parallel, series, and/or mixed parallel and series configuration; and
   a controller coupled to the plurality of diode rectifier circuits, wherein the controller is configured to reconfigure the plurality of high-power DC contactors based on a control parameter of the at least one multi-phased generator,
   wherein each of the plurality of diode rectifier circuits is configured to provide a DC voltage in each of the parallel, series, and/or mixed parallel and series configurations.

2. The system of claim 1, wherein the control parameter includes an input speed of the at least one multi-phased generator, and wherein the controller is configured to reconfigure the plurality of high-power DC contactors so that the outputs of the plurality of diode rectifier circuits are in a higher voltage configuration when the input speed falls below a threshold range.

3. The system of claim 1, wherein the control parameter includes an input speed of the at least one multi-phased generator, wherein the controller is configured to reconfigure the plurality of high-power DC contactors so that the outputs of the plurality of diode rectifier circuits are in a lower voltage configuration when the input speed rises above a threshold range.

4. The system of claim 3, wherein the control parameter includes the AC voltage and an excitation current of the at least one multi-phased generator, and wherein the controller is configured reconfigure the plurality of high-power DC contactors so that the outputs of the plurality of diode rectifier circuits are in a lower voltage configuration when the AC voltage rises above a threshold range and the excitation current is not at a maximum value.

5. The system of claim 1, further comprising a power source coupled to the plurality of diode rectifier circuits, wherein the power source is configured to provide an uninterrupted DC voltage when the high-power DC contactors are being reconfigured.

6. The system of claim 1, wherein the control parameter includes the AC voltage and an excitation current of the at least one multi-phased generator, and wherein the controller is configured to reconfigure the high-power DC contactors so that the outputs of the plurality of diode rectifier circuits are in a higher voltage configuration when the AC voltage falls below a threshold range and the excitation current is at a maximum value.

7. The system of claim 1, wherein the at least one multi-phase generator comprises a plurality of six-phases each coupled to a respective pair of diode rectifier circuits of the plurality of diode rectifier circuits.

8. The system of claim 1, wherein the at least one multi-phase generator comprises a twelve-phase generator.

9. A method, comprising:
receiving measurements corresponding to an input speed of at least one multi-phased generator;
comparing the measurements to a selected control parameter; and
reconfiguring outputs of a plurality of diode rectifier circuits in one of a parallel, series, and/or mixed parallel and series configuration based on the comparison, wherein the plurality of diode rectifier circuits are coupled to the at least one multi-phased generator and configured to convert an alternating current (AC) voltage to a direct current (DC) voltage,
wherein each of the plurality of diode rectifier circuits is configured to provide a DC voltage in each of the parallel, series, and/or mixed parallel and series configurations.

10. The method of claim 9, wherein the selected control parameter is an input speed of the at least one multi-phased generator, and wherein reconfiguring outputs of the plurality of diode rectifier circuits comprises reconfiguring the outputs to be in a higher voltage configuration when the input speed falls below a threshold value.

11. The method of claim 9, wherein reconfiguring outputs of the plurality of diode rectifier circuits comprises reconfiguring a plurality of high-power DC contactors coupled to the outputs, wherein the plurality of high-power DC contactors are configured to configure the outputs of the plurality of diode rectifier circuits to one of a parallel, series, and/or mixed parallel and series configuration.

12. The method of claim 9, wherein the selected control parameter is an input speed parameter of the at least one multi-phased generator, and wherein reconfiguring outputs of the plurality of diode rectifier circuits comprises reconfiguring the outputs to be in a lower voltage configuration when the input speed rises above a threshold value.

13. The method of claim 9, further comprising providing a backup DC voltage when the outputs of plurality of diode rectifier circuits are being reconfigured.

14. The method of claim 9, further comprising selecting a different control parameter in response to reconfiguring the outputs of the plurality of diode rectifier circuits.

15. The method of claim 9, further comprising delivering the DC voltage output to one or more load devices.

16. A non-transitory computer-readable medium having computer-executable instructions stored thereon which, when executed by one or more processors, cause the one or more processors to:
receive measurements corresponding to a control parameter of at least one multi-phased generator;
compare the measurements to a selected control parameter; and
reconfigure outputs of a plurality of diode rectifier circuits in one of a parallel, series, and/or mixed parallel and series configuration based on the comparison, wherein the plurality of diode rectifier circuits are coupled to the at least one multi-phased generator and configured to convert an alternating current (AC) voltage to a direct current (DC) voltage,
wherein each of the plurality of diode rectifier circuits is configured to provide a DC voltage in each of the parallel, series, and/or mixed parallel and series configurations.

17. The non-transitory computer-readable medium of claim 16, wherein the control parameter includes an AC voltage and excitation current of the at least one multi-phased generator and wherein the selected control parameter includes an AC voltage parameter and an excitation current parameter, and wherein to reconfigure outputs of a plurality of diode rectifier circuits further comprises to reconfigure the outputs to be in a higher voltage configuration when the AC voltage falls below a threshold range and the excitation current is at a maximum value.

18. The non-transitory computer-readable medium of claim 17, wherein the control parameter includes an input speed of the at least one multi-phased generator and the selected control parameter includes a selected input speed parameter, wherein to reconfigure outputs of a plurality of diode rectifier circuits based on the comparison further comprises to reconfigure the outputs of the plurality of diode rectifier circuits when the measurements fall below the selected input speed parameter.

19. The non-transitory computer-readable medium of claim 16, further comprising a power source coupled to the plurality of diode rectifier circuits, wherein the instructions further cause the one or more processors to activate the power source to provide a backup DC voltage when the outputs of the plurality of diode rectifier circuits are being reconfigured.

20. The non-transitory computer readable medium of claim 16, wherein the selected control parameter includes an AC voltage and excitation current of the at least one multi-phased generator, and wherein to reconfigure the outputs of a plurality of diode rectifier circuits further comprises to reconfigure the outputs to be in a lower voltage configuration when the AC voltage rises above a threshold range and the excitation current is not at a maximum value.

* * * * *